(12) United States Patent
Ihde et al.

(10) Patent No.: US 12,269,731 B2
(45) Date of Patent: Apr. 8, 2025

(54) METHODS AND SYSTEMS FOR FLUID CONTAINER VOLUME INDICATOR

(71) Applicant: Illinois Tool Works Inc., Glenview, IL (US)

(72) Inventors: Jeffery R. Ihde, Greenville, WI (US); Brian Randall Bellile, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/872,960

(22) Filed: Jul. 25, 2022

(65) Prior Publication Data

US 2023/0024527 A1    Jan. 26, 2023

Related U.S. Application Data (60) Provisional application No. 63/225,702, filed on Jul. 26, 2021.

(51) Int. Cl.
| | |
|---|---|
| *B67D 7/32* | (2010.01) |
| *B60K 15/03* | (2006.01) |
| *G01F 23/00* | (2022.01) |
| *B60K 15/035* | (2006.01) |

(52) U.S. Cl.
CPC ............ *B67D 7/3227* (2013.01); *B60K 15/03* (2013.01); *G01F 23/0015* (2013.01); *B60K 2015/03019* (2013.01); *B60K 2015/03523* (2013.01)

(58) Field of Classification Search
CPC .............. B67D 7/3227; G01F 23/0015; B60K 2015/03019; B60K 2015/03523; B60K 2015/03328; B60K 2015/03368; B60K 15/035; B60K 2015/0319; B60K 2015/03203; B60K 2015/03217; B60K 2015/03256; B60K 2015/03361; B60K 15/03519

See application file for complete search history.

(56) References Cited

U.S. PATENT DOCUMENTS

| | | | | |
|---|---|---|---|---|
| 2,905,137 | A | * | 9/1959 | Milnes ................ G01F 23/0015 116/112 |
| 4,083,387 | A | * | 4/1978 | Stieber ................... B67D 7/362 137/392 |
| 5,832,968 | A | * | 11/1998 | Leary ................... B60K 15/035 141/94 |
| 5,950,688 | A | * | 9/1999 | Langlois ............... B63B 25/082 141/7 |
| 5,975,154 | A | * | 11/1999 | Bennett .................. B67D 7/362 141/382 |

(Continued)

OTHER PUBLICATIONS

Definition of reed (Year: 2024).*
Definition of diaphragm (Year: 2024).*

*Primary Examiner* — Kelsey E Cary
(74) *Attorney, Agent, or Firm* — McAndrews, Held & Malloy, Ltd.

(57) ABSTRACT

An example fluid container fill indicator system generates an alert in response to a change in pressure at the exhaust conduit or the fluid container. In some example, the change in pressure causes a reed or whistle type device to generate an audible alert. In some examples, the alert is a mechanical and/or electronic signal based on a change in position or orientation of a valve in response to the change in pressure.

20 Claims, 4 Drawing Sheets

(56) References Cited

U.S. PATENT DOCUMENTS

| | | | |
|---|---|---|---|
| 7,748,416 B2 | 7/2010 | Bender et al. | |
| 8,689,994 B2 * | 4/2014 | Pashcow | B65D 90/34 116/109 |
| 2002/0157469 A1 * | 10/2002 | Cilia | B60K 15/00 73/61.54 |
| 2014/0190591 A1 * | 7/2014 | Scott | B60K 15/03 141/96 |
| 2020/0055491 A1 * | 2/2020 | Van Wyk | B67D 7/04 |

* cited by examiner

FIG. 5D

METHODS AND SYSTEMS FOR FLUID CONTAINER VOLUME INDICATOR

CROSS-REFERENCE TO RELATED APPLICATIONS

This application hereby claims priority to and the benefit of U.S. Provisional Application Ser. No. 63/225,702, entitled "Methods And Systems For Fluid Container Volume Indicator," filed Jul. 26, 2021. U.S. Provisional Application Ser. No. 63/225,702 is hereby incorporated by reference in its entireties for all purposes.

BACKGROUND

Conventional, filling a fuel tank or other fuel container is often difficult and imprecise. Typically, an operator filling the fuel tank relies on viewing the fuel level as it rises to determine when to discontinue a fueling operation. However, visibility of a fuel fill level within the tank may be limited or unavailable. Lack of visibility may result in under-filling the fuel tank, or may cause fuel to spill as the tank is over-filled. A system that provides a versatile and useful indication of a fuel fill level is therefore desirable.

SUMMARY

Systems and methods are disclosed of a fluid container fill indicator system configured to generate an audible alert in response to a change in pressure at the exhaust conduit or the fluid container, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Disclosed are examples of a fluid container fill indicator system configured to generate an alert, such as an audible alert, in response to a change in pressure at the exhaust conduit or the fluid container.

Conventionally, filling a fuel tank or other fuel container from a fuel can and/or gas pump is often difficult and imprecise. Typically, an operator filling the fuel tank relies on viewing the fuel level as it rises to determine when to discontinue a fueling operation. However, visibility of a fuel fill level within the tank may be limited or unavailable. Lack of visibility may result in under-filling the fuel tank, or may cause fuel to spill as the tank is over-filled. Some fuel tanks may include fuel gauges, but they often employ devices making contact with the fuel (e.g., a floating gauge) and/or electronic devices within the tank.

The disclosed systems and methods employ a device (e.g., a reed, whistle, valve, etc.) configured to convert forces from fluid exiting from a vent tube into an indication of a fuel level within a fluid container. For example, as the fluid container is filled, air and/or other gases are exhausted from the vent tube, the exhaust gases are forced past and/or through the device, resulting in changes to the character of the device (e.g., movement, vibration, position and/or orientation). The result can be employment and/or creation of a pathway and/or an aperture, causing an alert, an activation signal, and/or a mechanical response. For instance, an opening in such a sound producing device may be dimensioned to generate a particular sound or frequency as a particular flow rate or pressure. If a valve with a diaphragm is employed, the diaphragm may open in response to a threshold amount of pressure or range of pressure values, and/or allow an amount of exhaust to escape, which present a particular sound or frequency, and/or a range of particular sounds or frequencies.

In some examples, the alert is generated by passage of air through the pathway/aperture, causing an audible signal. In this regard, a frequency of the audible alert signal can change as the device moves and/or vibrates (e.g., based on the size and/or shape of the pathway/aperture), indicating a fill level of the fluid container, a fill rate of the fluid into the fluid container, etc. In an example, the device generates an audible tone, such as a whistle and/or resonant sound, as the exhausted gases are forced out through the vent tube, with the tone providing an indication of the fuel fill level. When the fuel level blocks the vent tube, the alert/tone will stop, indicating the point to stop the filling operation.

In some examples, the system, device, and/or valve may be connected (e.g., physically coupled) to a mechanical actuator. For instance, the mechanical actuator (e.g., a lever, a switch, a gear, a transmission, a pressure transducer, etc.) is configured to move (e.g., change in position and/or orientation) in response to the change in position or orientation of the device or valve. The mechanical actuator may be connected to a fuel level indicator (e.g., a mechanically operated display/indicator) configured to present a fuel level within the fluid container in response to movement of the mechanical actuator.

In some examples, the system, device, and/or valve may be connected (e.g., mechanically and/or electrically coupled) to control circuitry. For instance, a change in position and/or orientation of the device and/or valve may generate a mechanical and/or electrical response (e.g., activation of a switch, transmission of an electrical signal, etc.), which may be received at the control circuitry. The response can be recognized and/or analyzed by the control circuitry, which can provide an indication of the fuel In some examples, the response received at the control circuitry (e.g., signal strength, amount of force against a mechanical switch, etc.) may change in proportion to the change in movement (e.g., position and/or orientation) and/or vibration of the device, such that the control circuitry can generate an indication (e.g., a display, an audible alert, etc.) proportional to the changes in the valve corresponding to fuel fill level.

In some examples, the disclosed fluid container fill indicator system provides a fluid level indication for a fuel tank (e.g., fluid container) of an engine driven welder/generator system.

Further, in contrast to some engine powered machines, such as a motor vehicle, some example welder/generators draw power intermittently, which may require occasional adjustments to engine speed.

In some disclosed examples, the system includes control circuitry to monitor one or more operating characteristics of the system, such as a power demand on the engine, engine temperature, engine speed, an output of the welder/generator, a pressure level within the turbo system (or other pressurized auxiliary), as a list of non-limiting examples. Based on the operating characteristic, the control circuitry may trigger an automatic response on the system. This response can include adjusting an operating parameter associated with one or more of the turbo gasoline engine (e.g., engine speed), the welder/generator (e.g., an output), and/or one or more valves of the turbo system (e.g., to adjust airflow, temperature, pressure, etc.).

Advantageously, and by contrast to conventional systems, the presently disclosed system provides multiple benefits, such as simplicity of arrangement and operation, ability to retrofit into existing designs, ability to operate without power and/or circuitry, and the prevention of overfilling and fuel spills.

In disclosed examples, a fluid container fill indicator system includes a fluid container configured to receive a fluid, an exhaust conduit connected to the fluid container and configured to exhaust gases from the fluid container displaced by the fluid, and a sound producing device configured to vibrate or cause the air to vibrate to generate an audible alert signal in response to a change in pressure at the exhaust conduit.

In some examples, the sound producing device comprises a reed, which vibrates in response to the airflow. In examples, a frequency of the audible alert signal changes such that the frequency reaches a maximum level immediately prior to the fluid reaching a threshold fluid level within the fluid container.

In some examples, a sensor monitors one or more characteristics of the audible alert. A connected display is configured to present an indication of a fluid level. A connected control circuitry configured to receive information from the sensor corresponding to the one or more characteristics; determine a fluid level of the fluid container based on the information; and control the display to present an indication of the fluid level.

In disclosed examples, a fluid container fill indicator system includes a fluid container configured to receive a fluid, an exhaust conduit connected to the fluid container and configured to exhaust gases from the fluid container displaced by the fluid, and a valve configured to change position or orientation in response to a change in pressure at the exhaust conduit or the fluid container, and generate an alert signal in response to the change in position or orientation.

In some examples, the change in position or orientation of the valve creates an aperture causing the alert signal to be audible as the exhaust gases are forced past the valve.

In examples, a frequency of the audible alert signal changes based on changes in the position or orientation of the valve. In examples, the alert signal corresponds to a fuel level within the fluid container, the system further comprising a display configured to receive the alert signal and present an indication of the fuel level.

In examples, a mechanical actuator connected to the valve, the mechanical actuator configured to move in response to the change in position or orientation of the valve.

In some examples, a fuel level indicator connected to the mechanical actuator, the fuel level indicator configured to present a fuel level within the fluid container in response to movement of the mechanical actuator. In examples, the mechanical actuator is one of a lever or a switch.

In some examples, control circuitry connected to one or more of the valve or the mechanical actuator, the control circuitry configured to monitor changes in the position or orientation of the valve, or movement of the mechanical actuator, compare values corresponding to the monitored changes or movement to a list of threshold values associated with a fuel level, and generate the alert signal in response to the changes or movement violating a threshold value.

In some examples, the valve comprises a wheel configured to spin in response to a flow of gas through the exhaust conduit.

In some examples, an alarm configured to activate in responsive to movement of the spinning wheel. In examples, the valve is arranged within the exhaust conduit or at an end of the exhaust conduit. In examples, the fluid container is a fuel tank for an engine driven welder/generator system.

In disclosed examples, a fluid container fill indicator system includes a valve arranged at an exhaust connected to a fluid container and configured to exhaust gases from the fluid container displaced by a fluid, wherein the valve is configured to move in response to a change in pressure at the exhaust or the fluid container, and create an aperture in response to the movement of the valve, causing an audible alert as the exhaust gases are forced past the aperture.

In some examples, a frequency of the audible alert changes based on changes in a position or orientation of the valve. In examples, changes in the frequency of the audible alert are proportional to a degree or value of the changes in the position or orientation of the valve. In examples, the fluid container is configured to receive a fluid from a liquid fuel source via a fluid fill tube.

As used herein, the term "valve" includes any of numerous mechanical devices by which the flow of liquid, gas, or loose material in bulk may be started, stopped, or regulated by a movable part that opens, shuts, or partially obstructs one or more ports or passageways, which further includes the movable parts of such a device.

As used herein, the terms "welding-type system" and/or "welding system," includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the terms "welding-type power" and/or "welding power" refer to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor 150.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), spray, short circuit, and/or any other type of welding process.

As used herein, the terms "first" and "second" may be used to enumerate different components or elements of the same type, and do not necessarily imply any particular order.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the terms "welding parameter" includes one or more of voltage, current, power, wire feed speed, gas flow rate, pulse rate, workpiece thickness, workpiece material type, electrode type, welding process, travel speed, arc length, or joint type, as a list of non-limiting examples.

The term "power" is used throughout this specification for convenience, but also includes related measures such as energy, current, voltage, resistance, conductance, and enthalpy. For example, controlling "power" may involve controlling voltage, current, energy, resistance, conductance, and/or enthalpy, and/or controlling based on "power" may involve controlling based on voltage, current, energy, resistance, conductance, and/or enthalpy.

Figure 1A:
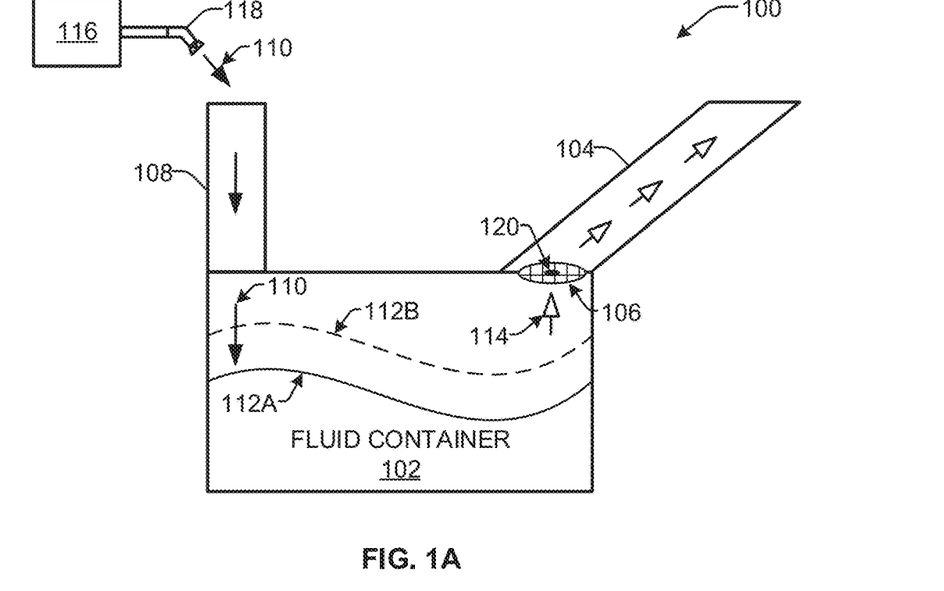
FIG. 1A illustrates a block diagram of an example fluid container fill indicator system, in accordance with aspects of this disclosure.

FIG. 1A is a block diagram of an example fluid container fill indicator system 100. As shown, the system 100 includes a fluid container 102 configured to receive a fluid 110, such as from a fuel source 116 via fuel delivery system 118 (e.g., a hose, spout, etc.). The fluid 110 is delivered to the fluid container 102 through an input or fuel neck 108. As the fluid 110 fills the fluid container 102, a volume of fluid 110 rises from a first level 112A to a second level 112B, forcing gases 114 displaced by the fluid to escape the container 102 via a connected exhaust conduit 104.

Figure 1B:
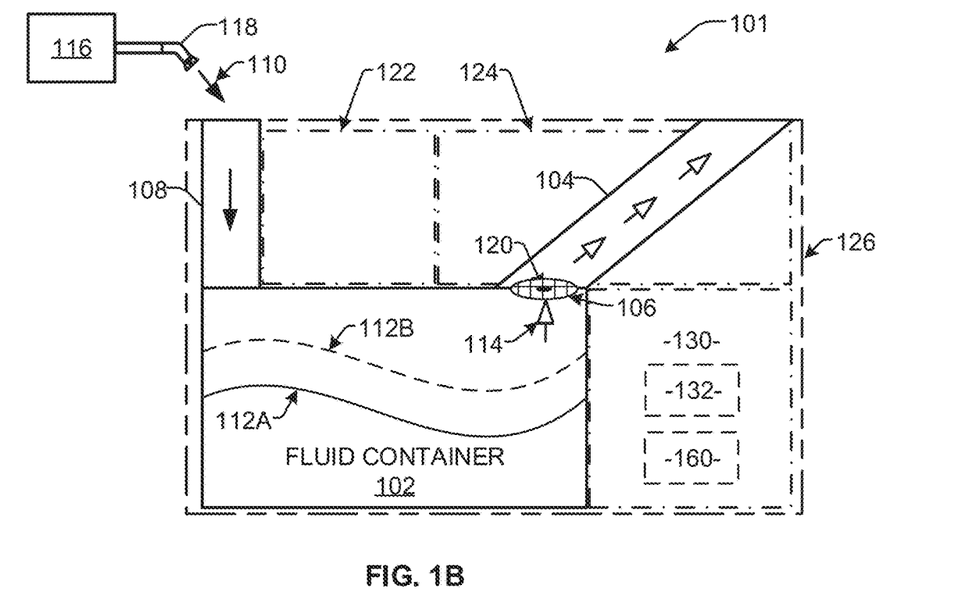
FIG. 1B illustrates a block diagram of the example fluid container fill indicator system incorporated with an engine driven welder/generator system, in accordance with aspects of this disclosure.

A device 106 (e.g., a valve, diaphragm, mechanical lever, membrane, etc.) is arranged at one or more locations along the exhaust conduit 104, partially or fully blocking the pathway for exhausted gases 114. The device 106 can be arranged at the entrance of the exhaust conduit 104, within the exhaust conduit 104 itself, and/or at an end of the exhaust conduit 104. In some examples, two or more device 106 may be employed, which may be identical or different valves. Further, the disclosed device 106 may be retrofitted into an existing fuel tank. Although the examples of FIGS. 1A and 1B illustrate the exhaust conduit 104 as a singular conduit having a particular shape, size, arrangement, and/or orientation, in disclose examples the exhaust conduit 104 may be arranged at any location relative to the fluid container 102 and/or the fuel neck 108, may be any geometry, size, and/or orientation, to suit the exhaust of gases as well as accommodate the device 106 and/or generate a desired alert.

In some examples, the device 106 is a sound producing device, through which gases and/or air are forced producing an audible tone. For instance, the sound producing device (e.g., a reed, a whistle, etc.) receives the forced air in a cavity and/or the air is forced against an edge of the device, thereby producing the tone.

The tone can be generated by vibration of the sound producing device, and/or vibration of the air itself (e.g., achieving resonance), in response to pressure from airflow. In some examples, a frequency, intensity, and/or volume of the tone changes in response to changes in the airflow rate, volume of airflow, and/or pressure. In this manner, the tone can be audible (e.g., above a threshold frequency or intensity) during a fill operation and softens to silence as the fluid container is filled (e.g., up to a threshold fill amount). In some examples, the tone is inaudible (e.g., below a threshold frequency or intensity) during the fill operation until the fluid reaches a threshold fill amount, at which time the tone becomes audible (e.g., rises above the threshold frequency or intensity).

For example, the device 106 is configured to produce a tone or tones within a range audible to a human operator. Typical audible ranges span a frequency range of 20 Hz to 20 kHz, or a decibel range of 0 dB to 120 dB, with preferred ranges between 2 kHz to 5 kHz, and 50 dB to 85 dB, respectively.

In some examples, the device 106 is a valve or other mechanical device, configured to change position or orientation in response to a change in pressure at the exhaust conduit (or the fluid container). For example, the valve may be configured to open proportional to the pressure from the exhaust, such that an alert signal is generated in response to the change in position or orientation.

In some examples, the signal is an audible alert having a frequency that changes based on changes in the position or orientation of the valve. Thus, the alert signal corresponds to a fuel level within the fluid container 102, which diminishes as the volume of gas shrinks and the volume of fluid increases until the alert signal stops altogether (e.g., when the fuel level 112B reaches the fuel neck 104), indicating completion of a fueling operation.

In additional or alternative examples, the device resides in a pressurized chamber associated with the fluid container. For instance, the device may be configured to move within and/or along the pressurized chamber (e.g., float) relative to the fluid level and/or the pressure level within the fluid container. In some examples, the device is configured to move (e.g., change position and/or orientation) in response to changes in the fluid level and/or the pressure level. The movement of the device can create a proportional change in another device and/or system, such as a sound producing device (e.g., responding to changes in physical movement of the device), an exposed and/or visible gauge (e.g., which moves within a visible display external to the fluid container), and/or an alert or display system (e.g., controlled by an electronic signal).

FIG. 1B is a block diagram of an example welding system 101, such as an engine driven welder/generator system 101. The example system 101 includes a gasoline powered engine 124 connected to an electric welder/generator 122, with the engine 124 configured to draw fuel from the fluid container 102. In some examples, the system 101 includes one or more components 130, including, but not limited to, an energy storage device 132 (e.g., a rechargeable battery) and/or control circuitry 160. As shown, the system 101 houses the electric welder/generator 122, the engine 124, the fluid container 102, and/or the one or more components 130 within a housing or enclosure 126. For example, an inlet for the fuel neck 104 can extend from and/or be incorporated within a wall of the housing 126.

Figure 2:
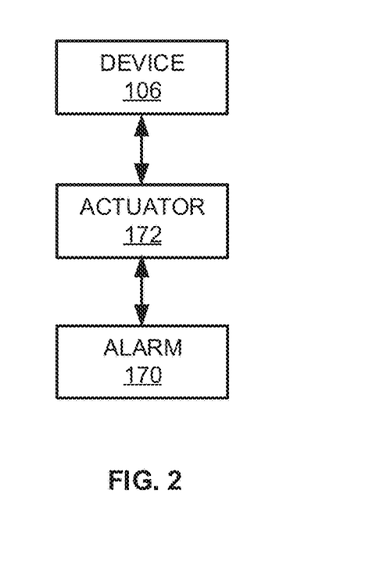
FIG. 2 illustrates a block diagram of an example fluid container fill indicator system including the example valve of FIG. 1A, in accordance with aspects of this disclosure.

FIG. 2 is a block diagram of an example fluid container fill indicator system 100. As shown, the device 106 may operate as a valve, connected to, coupled with, or otherwise configured to activate a mechanical actuator 172 (e.g., a lever, a switch, a gear, a transmission, a pressure transducer, etc.). For example, the mechanical actuator 172 may be configured to move in response to the change in position or orientation of the valve.

In some examples, the mechanical actuator 172 is connected to, coupled with, or otherwise configured to activate an alarm 170 (e.g., a fuel level indicator). Upon activation, the alarm 170 is configured to present a fuel level within the fluid container, such as audibly (e.g., via a speaker or circuitry), visually (e.g., via a display, light, etc.), and/or by movement of a physical device or element. The presentation of the fuel level, such as relative to a scale and/or other baseline value (e.g., over time) in response to movement of the mechanical actuator 172.

In an example, the device 106 and/or the mechanical actuator 172 includes a wheel configured to spin in response to a flow of gas through the exhaust conduit, such that the alarm 170 activates in responsive to movement of the spinning wheel. This could be a sound generated by rotation of the spinning wheel, and/or a signal (e.g., an electric signal) generated and/or transmitted in response to the rotational movement (e.g., via a conductor to carry a signal indicative of movement to a controller, such as control circuitry 160).

Figure 3:
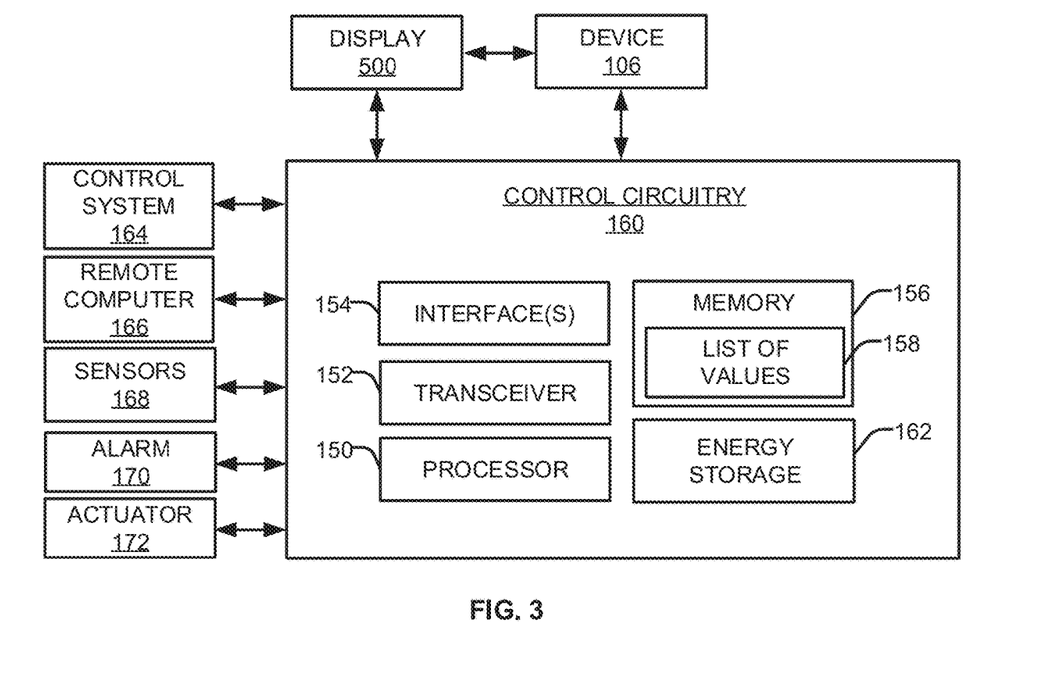
FIG. 3 illustrates a block diagram of example control circuitry for the fluid container fill indicator system of FIG. 1, in accordance with aspects of this disclosure.

FIG. 3 is a block diagram of the example control circuitry 160, which can be configured as a microcontroller, or to include a processor 150, to perform as a programmable logic circuit, a system-on-chip, a programmable logic device, and/or any other type of logic circuit. The control circuitry 160 can be included in one or more components of the systems 100/101 (e.g., the one or more components 130, etc.), and/or be implemented as a remote computer or control device 166 provided in FIG. 3.

In some examples, the controller 160 can include a transceiver to communicate with one or more of the device 106, the alarm 170, the mechanical actuator 172, the engine 124, the generator 122, etc. One or more interfaces 154 can be included with or connected to the control circuitry 160, to provide a communications link with one or more sensors 168, a control system 164 (e.g., of the engine 102, the generator 122, etc.), and/or a remote computer 166 (e.g., a remote control, a laptop, smart phone, etc.). The sensors 168 can be arranged at one or more components or locations about the system, and can be configured to monitor a variety of system characteristics, including, among other things, position or orientation of the device 106, movement of the mechanical actuator 172, activation of the alarm 170, etc. In some examples, one or more of the sensors 168 is configured to monitor and/or measure (e.g., internally and/or via processor 150) a characteristic (e.g., tone, intensity, frequency, etc.) of an audible alarm, and determine a fluid level of the fluid container 102 based on the audible alarm In some examples, the control circuitry 160 includes a memory storage device 156, and/or an energy storage device 162. For example, information related to operating characteristics, such as the conditions associated with operation of the device 106, etc., can be stored in a list 158, chart, library, etc., within memory 156.

Based on a determination at the control circuitry 160 (e.g., an analysis of a change in position or orientation of the device or valve 106, a comparison of the changes to stored data, etc.) the control circuitry 160 commands a response (e.g., activate/deactivate an alarm 170), and/or an adjustment to an associated system (e.g., discontinuation of the fueling operation and/or fuel source 116).

For instance, the control circuitry 160 can compare the monitored characteristic(s) (e.g., tone, intensity, or frequency of an audible alarm, monitored and/or calculated fuel level, etc.) to a list of threshold characteristics (stored as list 158) corresponding to the fuel level within the fluid container 102. Based on the comparison, the control circuitry 160 can activate/deactivate the alarm 170, and/or adjust an associated system.

In examples, information regarding system usage trends based on the monitored characteristics can be analyzed and stored (e.g., in memory 156). These stored trends can be used to predict when the control circuitry 160 should control the alarm 170, etc. The usage trends can be specific to the systems 100/101, or be loaded onto the memory 156 (via interfaces 154) to reflect usage trends of other systems.

In some examples, the system(s) 100/101 can include an interface 154 (e.g., a switch, a computer input device, etc.) to provide options for an operator to control the system 100. Additionally or alternatively, the interface 154 can include a list of operations with either a set of known parameters, or a list of operations that correspond to a learned operation. Thus, the known or historical actions and conditions during a particular operation will aid in the determination of when to activate/deactivate the alarm 170 and/or adjust an operating parameter of the systems 100/101.

Figure 4:
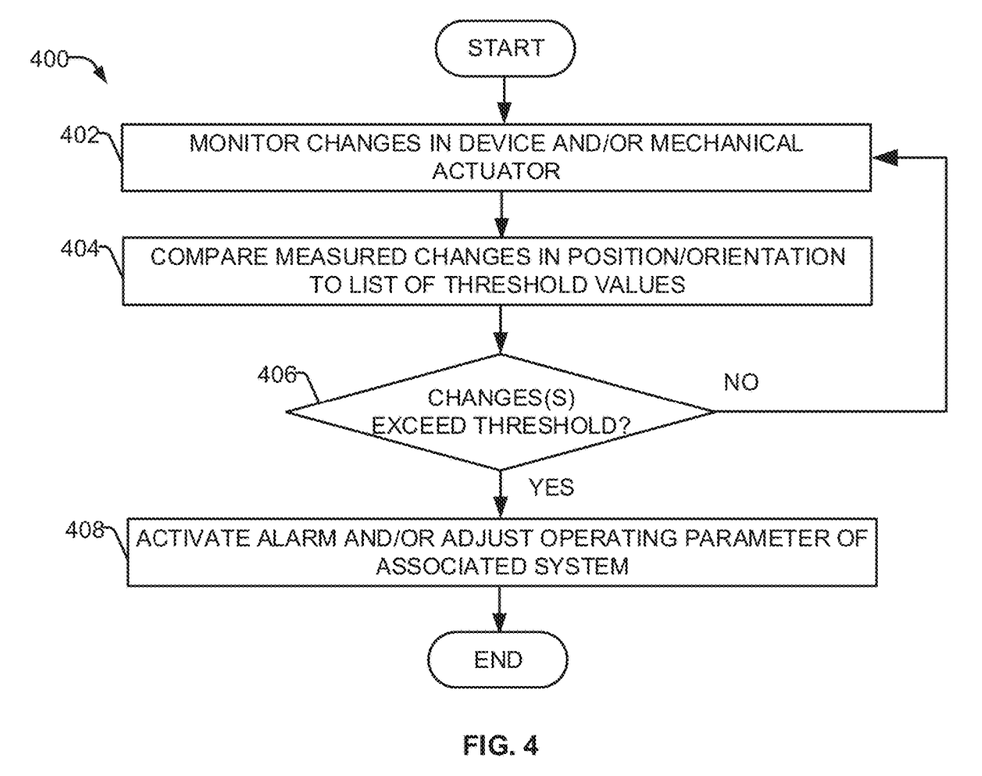
FIG. 4 illustrates example method of operating a fluid container fill indicator system, in accordance with aspects of this disclosure.

FIG. 4 is a flowchart illustrating example method 400 of operating a fluid container fill indicator system, for example, the system(s) 100/101 of FIG. 1A or 1B. The method 400 of FIG. 4 may be implemented by control circuitry (e.g., control circuitry 160) by executing machine-readable instructions, such as stored on a non-transitory machine-readable storage device (e.g., memory 156).

At block 402 of method 400, control circuitry (e.g., the control circuitry 160) connected to one or more of the device, valve or the mechanical actuator (e.g., mechanical actuator 172) and configured to monitor a position or orientation of the device (e.g., valve 106) or the mechanical actuator. For example, the control circuitry can receive information corresponding to opening of an aperture in valve and/or movement of the mechanical actuator, as a list of non-limiting examples.

At block 404, the control circuitry compares the measured change(s) to a list of threshold change values associated with a fuel level. For example, the change value(s) may be a discrete value, a range of values, and/or a change in values (e.g., over time). The threshold values may correspond to values associated with changes in position or orientation of the valve or mechanical actuator. Thus, the control circuitry compares the change value(s) to the threshold values to determine whether to activate an alarm or control an associated system at block 406.

If the control circuitry determines the monitored change value(s) do not cross a given threshold, the method returns to block 402 to continue to monitor the system for changes. If the control circuitry determines the monitored change value(s) has crossed a given threshold, the method proceeds to block 408 to activate the alarm and/or adjust an operating parameter of an associated system.

FIGS. 5A to 5D illustrate the display 500 presenting an indication of fluid fill level, in accordance with disclosed systems and methods. The display 500 can be any type of suitable display, such as a liquid crystal display (LCD), a light emitting display (LED), an organic light emitting display (OLED), as a list of non-limiting examples. For example, the display 500 may be connected to the device 106 and/or control circuitry 160, as shown in FIG. 3. In some examples, the display 500 receives a signal from the device 106 and/or control circuitry 160, the signal providing information corresponding to the fluid level within the fluid container 102. Based on the information (e.g., a digital signal, an analog signal, a mechanical adjustment from the device 106, etc.), the display is configured to present a fluid level and changes thereof. In some examples, the display 500 is further configured to present an indication of the fluid level as a visual display (e.g., a series of bars, a variety of colors, graphics, animations, text), while in some examples a secondary indication (e.g., an audible alert, a haptic feedback, etc.) is additionally or alternatively presented.

Figure 5A:
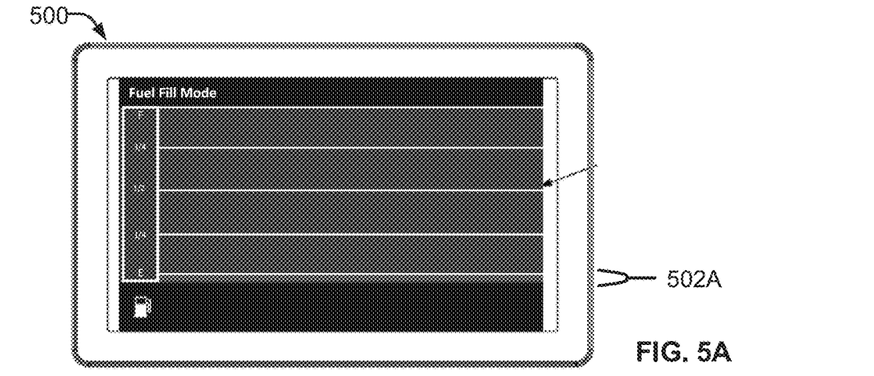
FIGS. 5A to 5D illustrate a display presenting an indication of fluid fill level, in accordance with aspects of this disclosure.
Figure 5B:
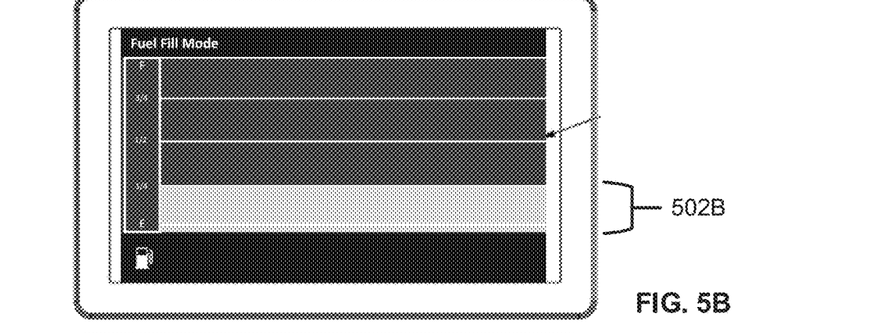
Figure 5C:
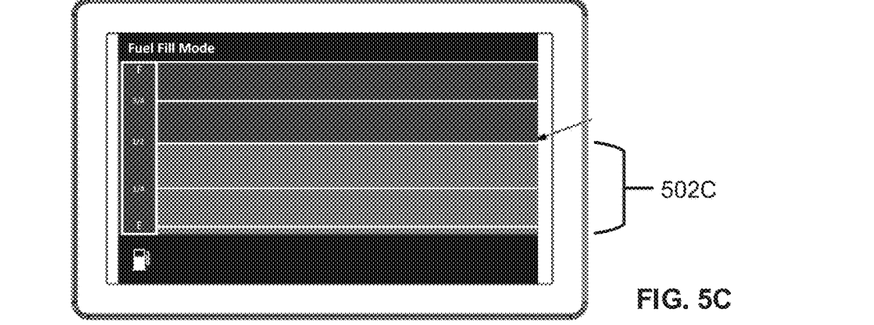
Figure 5D:
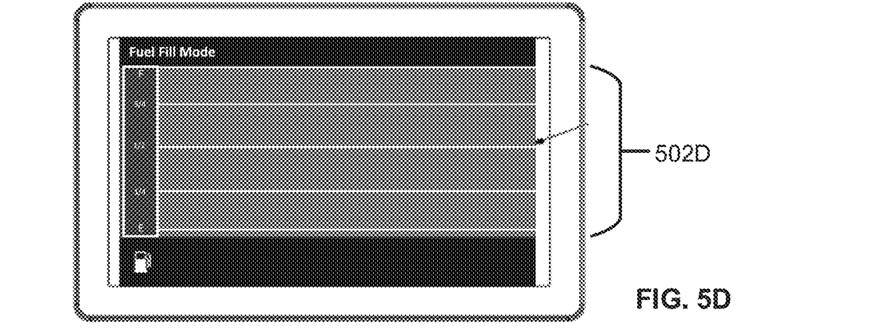

As shown in FIG. 5A, a first fluid level 502A represents a low or empty fluid container 102, indicated by a color (e.g., red), a bar height (e.g., below "E"), and may present a secondary indication (e.g., a flashing light, an audible alert, etc.). As the fluid level increases during a fluid fill operation, a second fluid level 502B is presented by a different color (e.g., yellow), a greater bar height (e.g., at ¼), and/or a secondary indication. As the fluid level reaches a half-way mark, a third fluid level 502C is presented by yet a another color (e.g., green), a greater bar height (e.g., at ½), and/or a secondary indication. The display continues to change as the fluid level increases until ultimately the fluid container 102 is full, and a fourth fluid level 502D is presented by a color (e.g., green, etc.), a top bar height (e.g., at "F"), and/or a secondary indication.

The display 500 may be arranged so as to be visible to an operator pouring fuel into the fluid container 102, and may be located on the fuel container 102 itself, on the housing 126, as part of a remotely connected computer 166 and/or another display (e.g., associated with control system 164), as a list of non-limiting examples. Further, the display 500 may present information associated with fuel levels, such as hours of operation, amount of operating hours remaining based on fuel reserves, day/time of last fueling operation, and/or diagnostic information associated with the electric welder/generator 122, the engine 124, and/or the device 106, as a list of non-limiting examples.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine-readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A fluid container fill indicator system, comprising:
a fluid container configured to receive a fluid, wherein the fluid container comprises a top surface having an opening through which exhaust gases displaced by the fluid escape from the fluid container;
a sound producing device positioned within the opening on the top surface of the fluid container, and configured to vibrate or cause the air to vibrate to generate an audible alert signal in response to a change in pressure at the fluid container; and
a sensor to monitor one or more characteristics of the audible alert;
wherein the alert signal is inaudible during a fill operation until the fluid reaches a threshold fill amount, at which time the alert signal becomes audible.

2. The system of claim 1, wherein the sound producing device comprises a reed, which vibrates in response to the airflow.

3. The system of claim 1, wherein a frequency of the audible alert signal changes such that the frequency reaches a maximum level immediately prior to the fluid reaching a threshold fluid level within the fluid container.

4. The system of claim 1, further comprising:
a display configured to present an indication of a fluid level; and
control circuitry configured to:
receive information from the sensor corresponding to the one or more characteristics;
determine a fluid level of the fluid container based on the information; and
control the display to present an indication of the fluid level.

5. A fluid container fill indicator system, comprising:
a fluid container configured to receive a fluid, wherein the fluid container is integrated with a housing of an engine driven generator system;
an exhaust conduit connected to the fluid container and configured to exhaust gases from the fluid container displaced by the fluid; and
a valve configured to:
change position or orientation in response to a change in pressure at the exhaust conduit or the fluid container; and
generate an alert signal in response to the change in position or orientation;
wherein the alert signal is inaudible during a fill operation until the fluid reaches a threshold fill amount, at which time the alert signal becomes audible.

6. The system of claim 5, wherein the change in position or orientation of the valve creates an aperture causing the alert signal to be audible as the exhaust gases are forced past the valve.

7. The system of claim 6, wherein a frequency of the audible alert signal changes based on changes in the position or orientation of the valve.

8. The system of claim 5, wherein the alert signal corresponds to a fuel level within the fluid container, the system further comprising a display configured to receive the alert signal and present an indication of the fuel level.

9. The system of claim 5, further comprising a mechanical actuator connected to the valve, the mechanical actuator configured to move in response to the change in position or orientation of the valve.

10. The system of claim 9, further comprising a fuel level indicator connected to the mechanical actuator, the fuel level indicator configured to present a fuel level within the fluid container in response to movement of the mechanical actuator.

11. The system of claim 9, wherein the mechanical actuator is one of a lever or a switch.

12. The system of claim 9, further comprising control circuitry connected to one or more of the valve or the mechanical actuator, the control circuitry configured to:
monitor changes in the position or orientation of the valve, or movement of the mechanical actuator;
compare values corresponding to the monitored changes or movement to a list of threshold values associated with a fuel level; and
generate the alert signal in response to the changes or movement violating a threshold value.

13. The system of claim 5, wherein the valve comprises a wheel configured to spin in response to a flow of gas through the exhaust conduit.

14. The system of claim 13, further comprising an alarm configured to activate in responsive to movement of the spinning wheel.

15. The system of claim 5, wherein the valve is arranged within the exhaust conduit or at an end of the exhaust conduit.

16. A fluid container fill indicator system comprising a valve arranged at an exhaust connected to a fluid container and configured to exhaust gases from the fluid container displaced by a fluid, wherein the valve includes a diaphragm that is configured to:
   move in response to a change in pressure at the exhaust or the fluid container; and
   create an aperture in response to the movement of the valve, causing an audible alert signal as the exhaust gases are forced past the aperture,
   wherein the alert signal is inaudible during a fill operation until the fluid reaches a threshold fill amount, at which time the alert signal becomes audible.

17. The system of claim 16, wherein a frequency of the audible alert changes based on changes in a position or orientation of the valve.

18. The system of claim 17, wherein changes in the frequency of the audible alert are proportional to a degree or value of the changes in the position or orientation of the valve.

19. The system of claim 18, wherein the frequency of the audible alert ranges between 2 kHz to 5 kHz.

20. The system of claim 18, wherein the fluid container is configured to receive the fluid from a liquid fuel source via a fluid fill tube.

* * * * *